(12) United States Patent
Beyers

(10) Patent No.: US 8,102,777 B2
(45) Date of Patent: Jan. 24, 2012

(54) NETWORK DIAGNOSTIC SYSTEMS AND METHODS FOR AGGREGATED LINKS

(75) Inventor: Timothy M. Beyers, San Francisco, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 128 days.

(21) Appl. No.: 11/953,534

(22) Filed: Dec. 10, 2007

(65) Prior Publication Data

US 2008/0181119 A1    Jul. 31, 2008

Related U.S. Application Data

(60) Provisional application No. 60/886,809, filed on Jan. 26, 2007.

(51) Int. Cl.
*G01R 31/08* (2006.01)
*G06F 11/00* (2006.01)

(52) U.S. Cl. ......... 370/241; 370/250; 370/252; 370/253

(58) Field of Classification Search .................. None
See application file for complete search history.

(56) References Cited

U.S. PATENT DOCUMENTS

| | | | | |
|---|---|---|---|---|
| 6,115,393 | A * | 9/2000 | Engel et al. .................... | 370/469 |
| 6,163,595 | A * | 12/2000 | Parker et al. ..................... | 379/22 |
| 6,526,044 | B1 * | 2/2003 | Cookmeyer et al. .......... | 370/352 |
| 7,149,795 | B2 * | 12/2006 | Sridhar et al. ................. | 709/223 |
| 7,251,215 | B1 * | 7/2007 | Turner et al. ................... | 370/231 |
| 7,843,843 | B1 * | 11/2010 | Papp et al. ...................... | 370/252 |
| 2003/0039254 | A1 * | 2/2003 | Ohnishi ..................... | 370/395.42 |
| 2005/0114083 | A1 * | 5/2005 | Bullis ............................ | 702/183 |
| 2006/0198319 | A1 | 9/2006 | Schondelmayer et al. | |
| 2007/0153796 | A1 * | 7/2007 | Kesavan et al. ............... | 370/392 |

* cited by examiner

*Primary Examiner* — Kevin C Harper
*Assistant Examiner* — Christine Duong
(74) *Attorney, Agent, or Firm* — Volentine & Whitt, PLLC

(57) ABSTRACT

A networking system is provided. The networking system may include a diagnostic module. The diagnostic module may include one or more statistics modules. The diagnostic module may include a routing module configured to route messages to the statistics modules. The messages may be derived from network messages from an aggregated link.

20 Claims, 10 Drawing Sheets

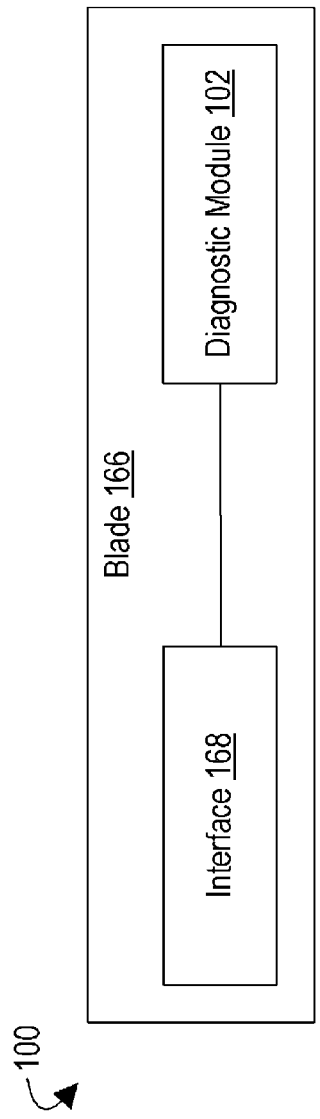
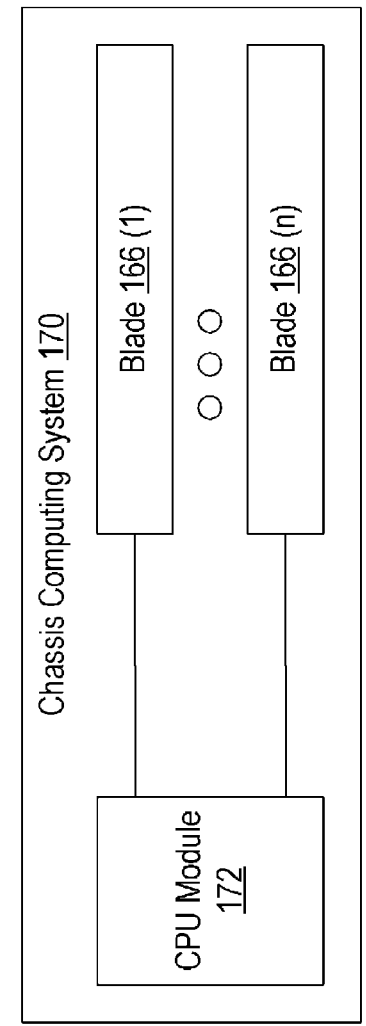

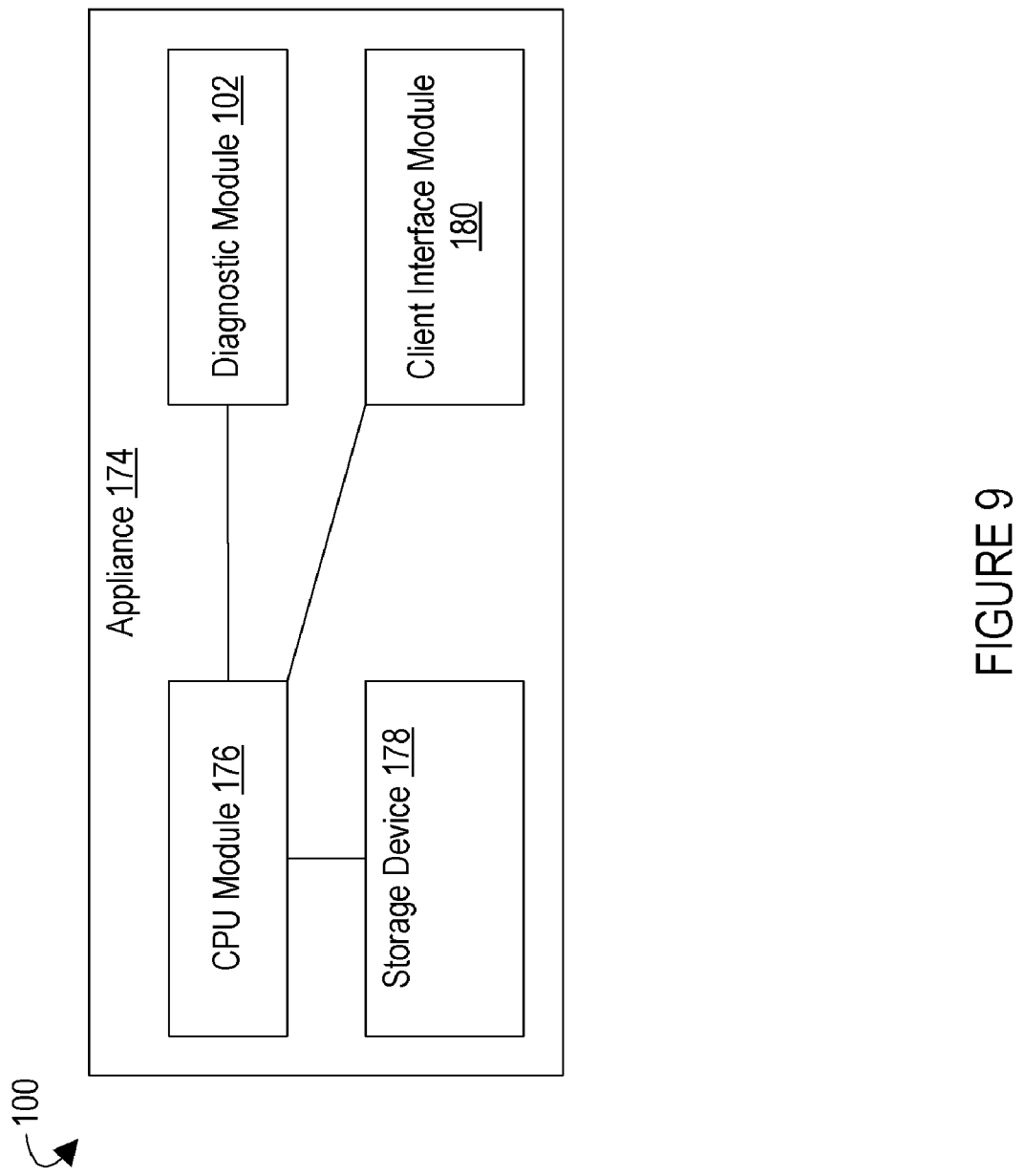

NETWORK DIAGNOSTIC SYSTEMS AND METHODS FOR AGGREGATED LINKS

CROSS-REFERENCE TO RELATED APPLICATIONS

This application claims priority to and the benefit of U.S. provisional patent application Ser. No. 60/886,809, which was filed on Jan. 26, 2007 and entitled NETWORK DIAGNOSTIC SYSTEMS AND METHODS FOR AGGREGATED LINKS, the disclosure of which is incorporated by reference herein in its entirety.

BACKGROUND OF THE INVENTION

1. Field of the Invention

The present invention relates generally to networking systems. More particularly, embodiments of the invention relate generally to the testing of high speed data transmission systems and components.

2. Background Technology

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANs")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET") and InfiniBand networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind many advancements in the area of high speed communication systems, methods and devices.

For example, the ever-increasing demand for network bandwidth has resulted in the development of technology that increases the amount of data that can be pushed through a single channel on a network. Advancements in modulation techniques, coding a algorithms and error correction have vastly increased the rates at which data can be transmitted across networks. For example, a few years ago, the highest rate that data could travel across a network was at about one Gigabit per second. This rate has increased to the point where data can travel across Ethernet and SONET networks at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

SUMMARY

A need therefore exists for systems and methods that reduce the above-described disadvantages and problems and/or other disadvantages and problems.

In one embodiment, a network diagnostic system may comprise a network diagnostic module. The network diagnostic module may comprise a first message receiving module configured to process network messages from a first communication path of an aggregated link into a first plurality of messages having an alternate structure. The network diagnostic module may also comprise a second message receiving module configured to process network messages from a second communication path of the aggregated link into a second plurality of messages having an alternate structure. The network diagnostic module may also comprise a routing module configured to route at least a portion of the first plurality of messages to any of a plurality of statistics modules. The routing module may also be configured to route at least a portion of the second plurality of messages to any of the plurality of statistics modules. The plurality of statistics modules may be configured to generate network diagnostic statistics.

In one embodiment, a network diagnostic system may comprise a network diagnostic module. The network diagnostic module may comprise a routing module. The routing module may be configured to route a first plurality of messages to any of a first set of two or more statistics modules. The first plurality of messages may be derived from network messages from a first communication path of an aggregated link. The first set of statistics modules may be configured to generate network diagnostic statistics. The routing module may be configured to route a second plurality of messages to any of a second set of two or more statistics modules. The second plurality of messages may be derived from network messages from a second communication path of the aggregated link. The second set of statistics modules may be configured to generate network diagnostic statistics; at least one member of the first set being in the second set.

For purposes of summarizing, some aspects, advantages and features of some embodiments of the invention have been described in this summary. Not necessarily all of (or any of) these summarized aspects, advantages or features will be embodied in any particular embodiment of the invention.

Some of these summarized aspects, advantages and features and other aspects, advantages and features may become more fully apparent from the following detailed description and the appended claims.

BRIEF DESCRIPTION OF THE DRAWINGS

To further clarify the above and other advantages and features of embodiments of the present invention, a more particular description of invention will be rendered by reference to specific embodiments thereof which are illustrated in the appended drawings. It is appreciated that these drawings depict only typical embodiments of the invention and are therefore not to be considered limiting of its scope. Embodiments of the invention will be described and explained with additional specificity and detail through the use of the accompanying drawings in which:

FIG. 8A is a block diagram of an embodiment of the networking system shown in FIG. 1, according to an embodiment of the invention;

FIG. 8B is a block diagram of an embodiment of the networking system shown in FIG. 1, according to an embodiment of the invention;

FIG. 9 is a block diagram of an embodiment of the networking system shown in FIG. 1, according to an embodiment of the invention.

DETAILED DESCRIPTION OF THE PREFERRED EMBODIMENTS

Certain embodiments relate generally to networking systems, including the testing of high speed data transmission systems and components. Embodiments of the invention may be used in other contexts unrelated to testing systems and components and/or unrelated to high speed data transmission.

Exemplary Networking System

Figure 1:
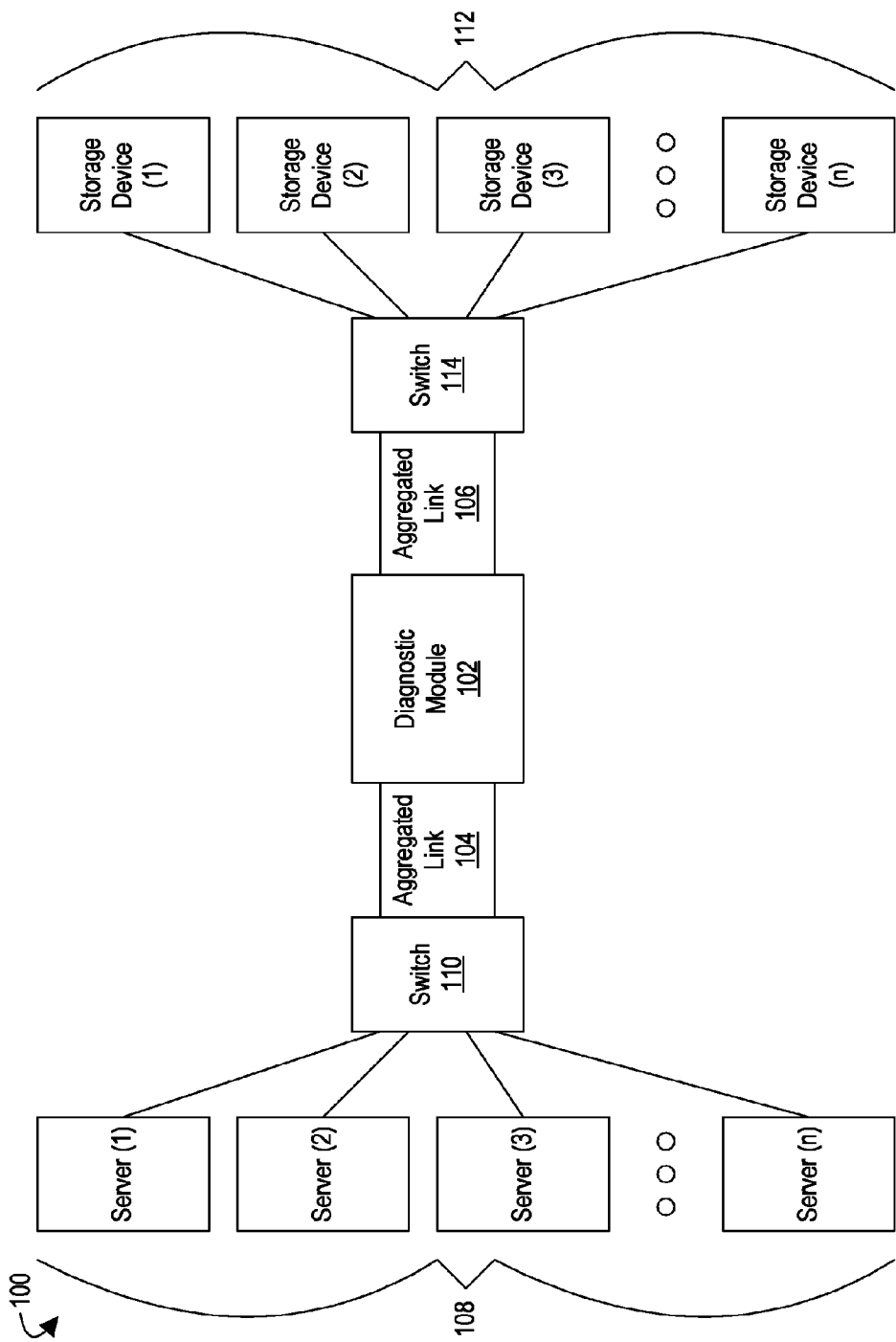
FIG. 1 is a block diagram of a networking system, which may include a diagnostic module, according to an exemplary embodiment of the invention.
Figure 2:
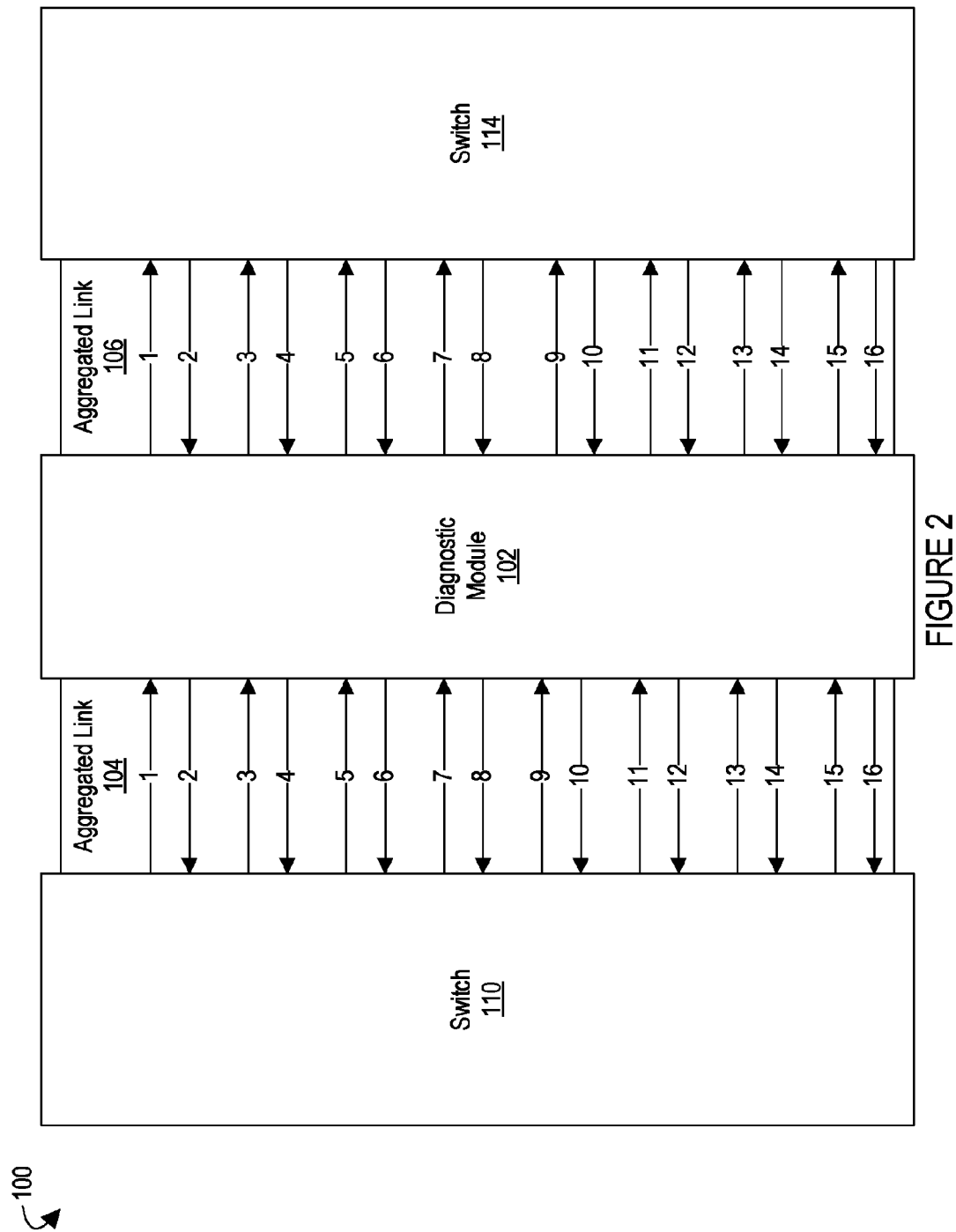
FIG. 2 is a block diagram illustrating an embodiment of the networking system shown in FIG. 1.

FIG. 1 is a block diagram of an exemplary networking system 100. FIG. 2 is a block diagram illustrating aggregated links that may be included in the networking system 100 shown in FIG. 1. As shown in FIGS. 1-2, a diagnostic module 102 may be connected to and/or access one or more aggregated links 104, 106. The diagnostic module 102 may, for example, be connected in-line between the aggregated links 104, 106; may be connected to one or more aggregated links 104, 106; and/or may access one or more aggregated links 104, 106, if desired. It will be appreciated, however, that the diagnostic module 102 need not be connected in-line between the aggregated links 104, 106 and may access one or more aggregated links 104, 106 via, for example, a TAP (Test Access Point/Traffic Access Point).

The diagnostic module 102 can perform various operations on the data that is a transmitted over the aggregated links 104, 106. As described in more detail below, the diagnostic module 102 can monitor data transmitted on the aggregated links 104, 106.

The networking system 100 may include one or more nodes. As used herein, a "node" includes, but is not limited to, a server or host; a client or storage device; a switch; a hub; a router; all or a portion of a SAN fabric; a diagnostic device; and any device that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" includes, but is not limited to, a packet; a datagram; a frame; a data frame; a command frame; an ordered set; any unit of data capable of being routed (or otherwise transmitted) through a computer network; and the like. In one embodiment, a network message may comprise transmission characters used for data purposes, protocol management purposes, code violation errors, and the like. Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), SAS/SATA, Serial SCSI Architecture ("SSA"), and the like.

Aggregated Links

Nodes in a network may communicate using switches, aggregated links, other suitable means, or any combination thereof. For example, FIG. 1 illustrates servers 108 communicating with a switch 110, and storage devices 112 communicating with a switch 114. The switches 110 and 114 may communicate with each other using one or more aggregated links (such as, aggregated links 104 and 106) and/or any other suitable line or connection.

As used herein, an "aggregated link" comprises a plurality of communication paths implemented as a single logical link. Because these communication paths are implemented as a single logical link, a switch or other type of node may use any of these communication paths to send a network message. Because the switch or node may use any of these communication paths, the switch or node need not wait for a particular communication path to become available in order to send a particular network message. Consequently, many communication bottlenecks may be avoided through load balancing communication among the various communications paths of an aggregated link.

In one embodiment, an aggregated link comprises a plurality of communication paths in one direction implemented as a single unidirectional logical link. In one a embodiment, an aggregated link comprises a first plurality of communication paths in a first direction and a second plurality of communication paths in an opposing second direction implemented as a single bidirectional logical link.

The aggregated links 104 and 106 are preferably bidirectional to provide two or more communication paths in one direction and two or more communication paths in an opposite direction. For example, as shown in FIG. 2, the aggregated links 104 and 106 may comprise a first set of eight channels or other types of communication paths in a first direction from the switch 110 to the switch 114 (that is, channels 1, 3, 5, 7, 9, 11, 13, and 15) and a second set of eight channels or other types of communication paths in a second direction from the switch 114 to the switch 110 (that is, channels 2, 4, 6, 8, 10, 12, 14, and 16).

Because a bidirectional aggregated link may provide a plurality of communication paths in opposing directions, a first network message may be sent on any of the communication paths in one direction and a second network message sent in response to the first network message may be sent on any of the communication paths in the opposing direction. For example, as shown in FIG. 2, the switch 110 could send a first network message from a first node on any of the channels 1, 3, 5, 7, 9, 11, 13, and 15. The switch 114 could then forward the first message to a second node. The switch 114 could send a reply network message from the second node on any of the channels 2, 4, 6, 8, 10, 12, 14, and 16 to the switch 110. The switch 110 could then forward the reply network message to the first node.

A variety of configurations of structures may be used to implement an aggregated link's communication paths. An aggregated link's communication paths may be implemented using a single cable (such as, a fiber optic cable, copper wire, and other suitable communication mediums) or a plurality of cables. It will be appreciated that a cable may be bidirectional (which may provide at least one communication path in one direction and at least one communication path in an opposing direction) or unidirectional (which may provide at least one communication path in one direction). It will be appreciated, however, that cables are not required and that any other suitable means may be used to implement an aggregated link's communication paths.

In one embodiment, a trunk line may be used to implement some or all of an aggregated link's communication paths. The trunk line preferably comprises a plurality of cables, each cable providing at least one communication path. For example, in one embodiment, the trunk line may comprise 8 bidirectional cables providing 16 communication paths or channels. Also, for example, in one embodiment, the trunk line may comprise 4 bidirectional cables providing 8 communication paths or channels.

In one embodiment, at least one cable providing a plurality of communication paths may be used to implement some or all of an aggregated link's communication paths. For example, an individual cable may provide a plurality of communication paths via multiplexing, such as wavelength division multiplexing, frequency division multiplexing, or time division multiplexing.

In one embodiment, some or all of the channels 1-16 of the aggregated links 104, 106 may each provide about 8.5 gigabits per second bandwidth, 4.25 gigabits per second bandwidth or other bandwidths, if desired. In one embodiment, an aggregated link may include 32 channels or communications paths (16 in one direction and 16 in an opposing direction) each providing about 4 gigabit per second bandwidth. These 32 channels or communication paths may be implemented, for example, using 16 bidirectional optical cables, or any number of other suitable cables or means. Of course, an aggregated link may provide less than 16, more than 16, less than 32, more than 32, or any other suitable number of channels or communication paths in any direction. Also, the channels or communication paths of an aggregated link may have any other suitable bandwidth, including lesser or greater bandwidths. Further, an aggregated link may provide the same number or a different number of communication paths in opposing directions.

Although FIGS. 1 and 2 illustrate a networking system 100 with aggregated links, it will be appreciated that the networking system 100, could use other suitable types of links, connections, or communication mediums in place of (or in addition to) aggregated links.

Exemplary Diagnostic Module

With continued reference to FIGS. 1 and 2, the networking system 100 may comprise a network, network diagnostic system, a network testing system, or the like including one or more diagnostic modules (such as, a diagnostic module 102), which may be configured to communicate network messages among nodes. In one embodiment, the diagnostic module 102 may comprise one or more hardware modules, one or more software modules, other suitable modules, or any combination thereof.

The diagnostic module 102 may be inserted between the switches 110 and 114 such that the network traffic along the aggregated links 104, 106 is available to the diagnostic module and/or is routed through the diagnostic module 102.

If desired, the diagnostic module 102 may be configured to send and/or receive a signals or data. Accordingly, using a signal, the diagnostic module 102 may receive one or more network messages from a node, send one or more network messages to a node, or both. For example, the switch 110 may send (via the aggregated link 104) a network message for the switch 114, which network message the diagnostic module 102 may receive and may send (via the aggregated link 106) to the switch 114. Similarly, the switch 114 may send (via the aggregated link 106) a network message for the switch 110, which network message the diagnostic module 102 may receive and may send (via the aggregated link 104) to the switch 110.

The diagnostic module 102 may perform a variety of network diagnostic functions. In performing some of these diagnostic functions, the diagnostic module 102 may be configured to be passive to network traffic comprising one or more network messages. If desired, the diagnostic module may receive at least some of the network traffic, and may transmit some or all of the received traffic. In performing other diagnostic functions, the diagnostic module 102 may be configured to alter some or all of the network traffic and/or generate network traffic.

It will be appreciated, however, that the traffic need not be routed through the diagnostic module 102. In addition, the switches 110 and 114 may communicate via a single aggregated link, which the diagnostic module 102 may access via a passive tap, if desired.

The diagnostic module 102 may perform its network diagnostic functions on any type of network and/or network topology using any number of network protocols—including, but not limited to, those networks, topologies, and protocols recited in this application.

Monitor

As mentioned above, the diagnostic module 102 may perform variety of network diagnostic functions. For example, the diagnostic module 102 could be configured to function as any combination of: a bit error rate tester, a protocol analyzer, a generator, a jammer, a monitor, and any other appropriate network diagnostic device. Exemplary network diagnostic devices and functions are disclosed in U.S. patent application Ser. No. 11/344,893, filed Feb. 1, 2006 and entitled NETWORK DIAGNOSTIC SYSTEMS AND METHODS FOR AGGREGATED LINKS, which is hereby incorporated by reference herein in its entirety.

The diagnostic module 102 is preferably configured to function as a monitor, which may be used to derive statistics from one or more network messages having particular characteristics, one or more conversations having particular characteristics, and the like.

As described below, the monitor may be configured to receive a bit sequence via one or more communication paths or channels. Typically, the monitor passively receives the network messages via one or more passive network connections.

To determine the network messages and/or the conversations from which statistics should be derived, the monitor may be configured to compare a received a bit sequence—such as a network message—(or a portion of the received bit sequence) with one or more bit sequences or patterns. Before performing this comparison, the monitor may optionally apply one or more bit masks to the received bit sequence. In performing this comparison, the monitor may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a network message to a particular node, a network message between or among a plurality of particular nodes, a network message of a particular format or type, a network message having a particular error, and the like. Accordingly, the monitor may be configured to detect a network message having any specified characteristics—including but not limited to whether the network message is associated with a particular conversation among nodes.

Upon detecting a network message having specified characteristics, the monitor may create and update data structure entries to maintain statistics for individual network messages and/or for conversations comprising network messages between nodes. For example, a monitor may count the number of physical errors (such as, bit transmission errors, CRC error, and the like), protocol errors (such as, timeouts, missing network messages, retries, out of orders), other error conditions, protocol events (such as, an abort, a buffer-is-full message), and the like. Also, as an example, the monitor may create conversation-specific statistics, such as, the number of packets exchanged in a conversation, the response times associated with the packets exchanged in a conversation, transaction latency, block transfer size, transfer completion status, aggregate throughput, and the like. It will be appreciated that a specified characteristic could be the presence of an attribute or the lack of an attribute.

Exemplary Diagnostic Module Architecture

Figure 3:
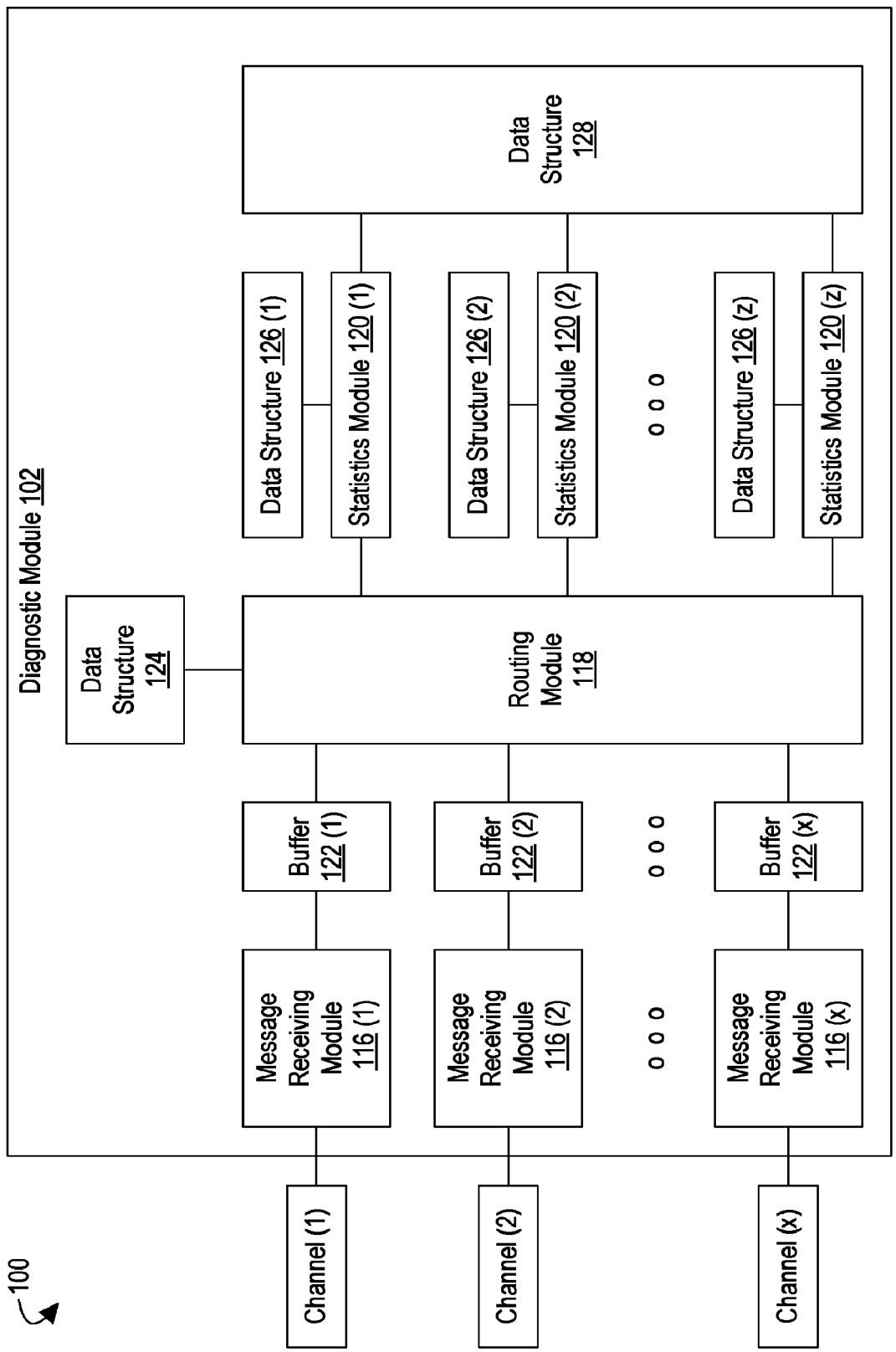
FIG. 3 is a block diagram of an exemplary embodiment of architecture that may be used to implement the diagnostic module shown in FIGS. 1 and 2.

FIG. 3 is a block diagram of an exemplary embodiment of architecture that may be used to implement the diagnostic module 102 (FIGS. 1 and 2) using one or more hardware modules, software modules, and/or other suitable modules.

As shown in FIG. 3, the diagnostic module 102 may include one or more message receiving modules 116. The message receiving modules 116 may be configured to receive signals from one or more communication paths (such as, the channels 1-16 of the aggregated links 104, 106 in FIG. 2, or any other type or number of communication paths). Accordingly, the message receiving modules 116 may receive one or more network messages from those paths and, as discussed in further detail below, may process those network messages.

The diagnostic module 102 may include at least one routing module 118 and plurality of statistics modules 120. As discussed in further detail below, the routing module 118 may route network messages (for example, those received and/or processed by the message receiving modules 116) to the statistic modules 120.

The diagnostic module 102 may include one or more buffers 122, which may be stored in any suitable storage devices. A message receiving module 116 may store the network messages it receives and/or processes in a buffer 122. The routing module 118 may retrieve and/or receive those network messages from the buffers 122 and may route them to the statistics module 120. The diagnostic module 102 may also include one or more data structures (such as data structures 124, 126, 128), which may be stored in any suitable storage device.

Exemplary Network Diagnostic Methods

Figure 4:
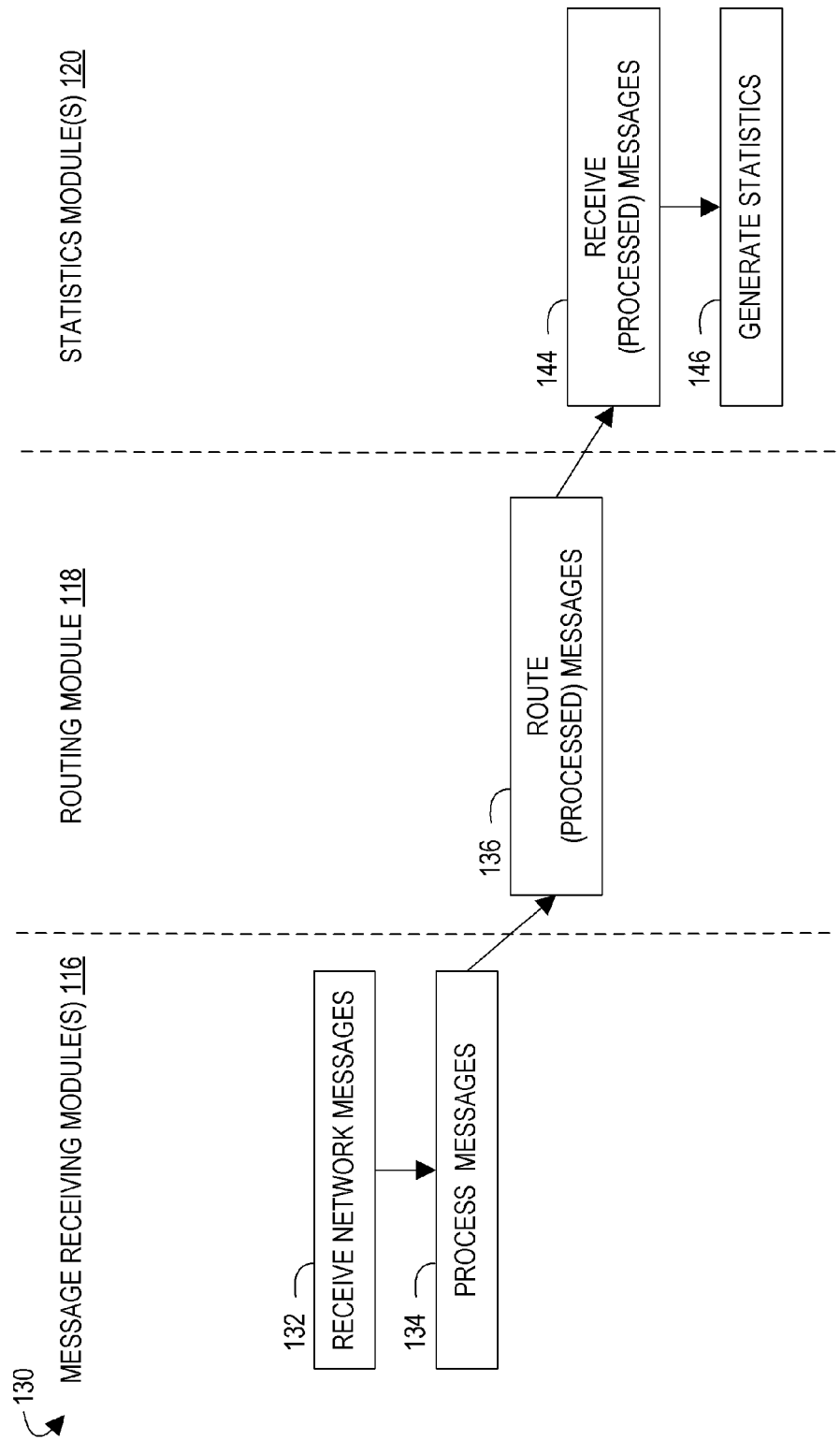
FIG. 4 is a flow chart of a method, which may be used to perform one or more network diagnostic functions, in accordance with an embodiment of the invention.

FIG. 4 is a flow chart of a method 130, which may be used to test a plurality of network messages sent among nodes, in accordance with an embodiment of the invention. The method 130 may be performed by the system 100; the diagnostic module 102; one or more message receiving modules 116; the routing module 118; one or more statistics modules 120; one or more other suitable components, systems, modules, and the like; or any combination thereof. Of course, the entire method 130 need not be performed; and any part or parts of the method 130 may be performed to provide a useful method 130.

Referring to FIGS. 3 and 4, at the block 132, one or more message receiving modules 116 may receive network messages from one or more communication paths. As described above, such communication paths may form at least a part of an aggregated link. In addition, such communication paths may form at least a part of unidirectional link or at least a part of a bidirectional link. Further, such communications paths may be implemented using a single cable, a plurality of cables and/or any other suitable medium. Thus, in one embodiment, the message receiving modules 116 may receive network messages from an aggregated link. In one embodiment, the message receiving modules 116 may receive network messages from a trunk line. In a preferred embodiment, a message receiving module 116 may be configured to receive network messages from a subset of the communication paths provided by a trunk line. For example, a first message receiving module 116, a second message receiving module 116, etc. may be configured to receive network messages from, respectively, a first subset comprising one or more communication paths provided by a trunk line, a second subset comprising one or more communication paths provided by the trunk line, etc. If desired, these subsets may be mutually exclusive. For example, each individual message receiving module 116 may be configured to receive network messages from a single communication path provided by, for example, a single cable of the trunk line. Of course, these subsets need not be mutually exclusive and an individual message receiving module 116 may be configured to receive network messages from multiple communication paths and from multiple cables of a trunk line, if desired.

At the block 134, the message receiving modules 116 may process the received network messages into one or more messages having an alternative, substitute, different, or otherwise alternate format or structure adapted to be used by the statistics modules 120 to perform one or more network diagnostic functions. It will be appreciated, however, that the message receiving modules 116 need not process the received network messages into one or more messages having an alternative, substitute, different, or otherwise alternate format or structure and thus need not perform the block 134.

At a block 136, the routing module 118 may route the processed messages (or the unprocessed messages) to the statistics modules 120.

Processing Received Network Messages

Figure 5:
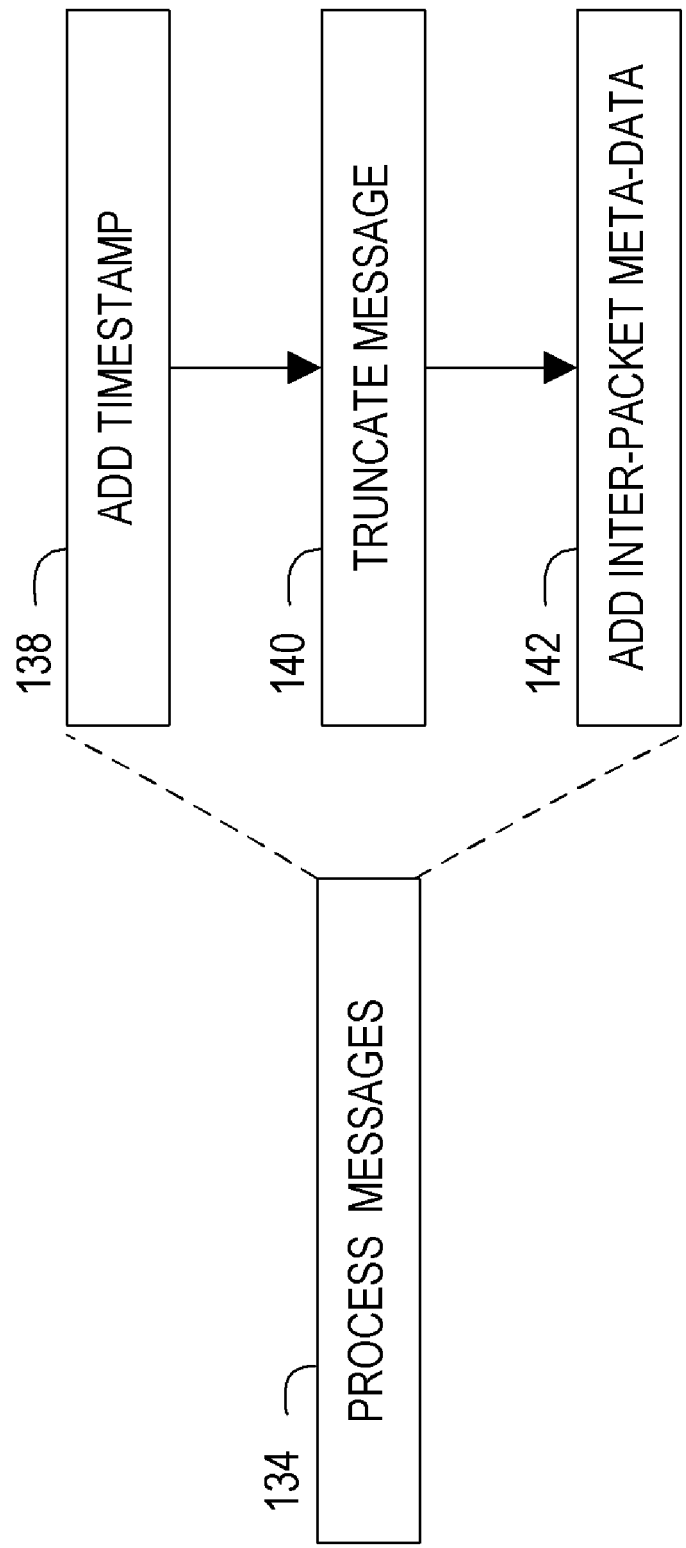
FIG. 5 is a flow chart of a method, which may be used to perform one or more network diagnostic functions, in accordance with an embodiment of the invention.

FIG. 5 is a block diagram illustrating an exemplary embodiment of how a message receiving module 116 may process received network messages at the block 134 (FIG. 4). In particular, as shown in FIG. 5, the block 134 may include one or more blocks, such as blocks 138, 140, 142. It will be appreciated, however, that the block 134 does not require any of the blocks 138, 140, 142.

The received network messages may have a first format adapted to comply with at least one network protocol supported by the networking system 100. In processing the network messages at the block 134, the message receiving module 116 may process a set of one or more received messages into a set of one or more messages having an alternative, substitute, different, or otherwise alternate format or structure. Thus, the set of one or more messages having an alternative, substitute, different, or otherwise alternate format or structure may be derived from the set of one or more received messages.

For example, at the block 138, the message receiving module 116 may generate and add a timestamp to the network message. The timestamp may indicate when the message receiving module 116 received at least a portion of the network message or any other suitable time.

At the block 140, the message receiving module 116 may truncate at least a portion of the received network message. For example, in some embodiments, the network message may include a header portion, a payload or other data portion, and/or other portions. The message receiving module 116 may discard or otherwise remove some or at least a portion of the data portion—thus truncating the network message. In some embodiments, the message receiving module 116 may be configured to detect the type of network message and dynamically determine which, if any, portions of a network message may be removed. For example, the message receiving module 116 may be configured to detect that a network message includes a nested or layered message within the network message's data portion—thus allowing the message receiving module 116 to retain any desired portions of the nested message and remove any other portions.

At the block 142, the message receiving module 116 may add (to the received network message) meta-data adapted to describe at least a portion of the network messages that occurred between the received network message and another network message. For example, a received network message may comprise a packet, a frame, or the like that is received after an earlier network message that comprised a packet, a frame, or the like. In this example, the meta-data may comprise, for instance, data describing the number and/or types of ordered sets that were received between the earlier network message and the received network message.

As shown above, a message receiving module 116 may, at the block 134, process the received network messages into one or more messages having an alternative, substitute, different, or otherwise alternate format or structure adapted to be used by the statistics modules 120 to perform one or more network diagnostic functions. The alternate format messages may include any suitable combination of: a timestamp, at least a portion of a network message (which may or may not be truncated), inter-packet meta-data, any other suitable data that may be useful for the statistics modules 120, or any combination thereof. In one embodiment, an alternate format message may also include one or more delimiters adapted to indicate the start and end of the alternate format message and/or processing meta-data adapted to describe how the received network message was truncated or otherwise processed by the message receiving module 116. Accordingly, the statistics modules 120 may advantageously use the timestamp, any portion of a received network message, the inter-packet meta-data, the delimiter, the processing-meta data, and/or any other data provided by the alternate format messages to determine how to perform various diagnostic functions.

Statistics Management

As shown in FIG. 4, one or more statistics modules 120 may receive the messages at the block 144. At the block 146, the statistics modules 120 may function as a monitor to generate one or more statistics using the messages that were received at the block 144. For example, at the block 146, the statistics modules 120 may use one or more data structures 126, 128 to count the number of physical errors (such as, bit transmission errors, CRC error, and the like), protocol errors (such as, timeouts, missing network messages, retries, out of orders), protocol events (such as, an abort, a buffer-is-full message), and the like. Also, as an example, at the block 146, the statistics modules 120 may create conversation-specific statistics, such as, the number of packets exchanged in a conversation, the response times associated with the packets exchanged in a conversation, and the like. Of course, the statistics modules 120 may generate any of a variety of other suitable statistics at the block 146.

In one embodiment, to generate the statistics at the block 146, a statistics module 120 may use a data structure 126 in FIG. 3 to store data indicating (1) whether space in the data structure 128 in FIG. 3 has been allocated for maintaining statistics related to the conversation associated with a received message and (2) the location of that space, if allocated. Consequently, the statistics module 120 may access and/or update those statistics in view of the received message.

As shown, in further detail with reference to FIGS. 7-9 below, the diagnostic module 102 may communicate with a central processing unit ("CPU") module, such as, a central processing unit or other suitable processor, which may help prepare the statistics in the data structure 128 for client retrieval.

Routing Messages

Figure 6:
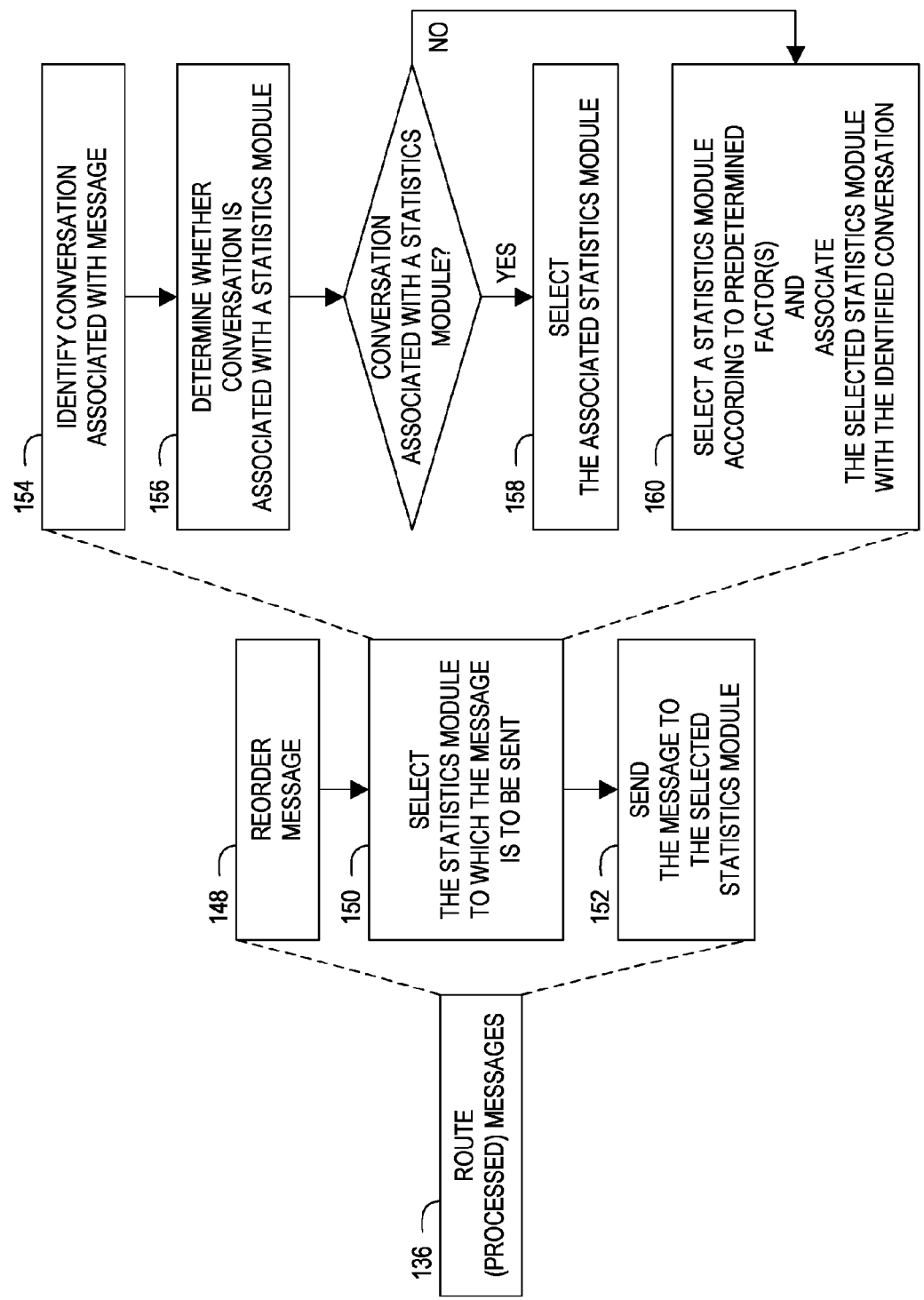
FIG. 6 is a flow chart of a method, which may be used to perform one or more network diagnostic functions, in accordance with an embodiment of the invention.

FIG. 6 is a block diagram illustrating an exemplary embodiment of how the routing module 118 may route the processed or unprocessed messages to the statistics modules 120 at the block 136 (FIG. 4). In particular, as shown in FIG. 6, the block 136 may include one or more blocks, such as blocks 148, 150, 152. It will be appreciated, however, that the block 136 does not require any of the blocks 148, 150, 152.

At the block 148, the routing module 118 may reorder a message relative to one or more other messages. For example, to reorder the messages into a desired order, the routing module 118 may be configured to select messages from a variety of the buffers 122 according to the timestamps that were added at the block 138 (FIG. 5). It will be appreciated that the messages may be reordered according to other suitable criteria, that the routing module 118 need not reorder the messages, and that the diagnostic module 102 does not require reordering the messages depending, for example, upon the particular implementation of the diagnostic module 102.

At the block 150, the routing module 118 may select a statistics module 120 to which the message is to be sent, and the routing module 118 may send the message to the selected statistics module 120 at the block 152.

As shown in FIG. 6, the block 150 may include one or more blocks, such as blocks 154, 156, 158, 160. It will be appreciated, however, that the block 150 does not require any of the blocks 154, 156, 158, 160.

At the block 154, the routing module 118 may identify a conversation associated with a message to be routed. The conversation may include, for example, an exchange, a session, and/or other identifiable group of communications between a pair of nodes.

At the block 156, the routing module 118 may determine whether the identified conversation is associated with a statistics module 120. In one embodiment, to determine whether a conversation is associated with a statistics module 120, the routing module 118 may access the data structure 124 to determine whether it contains data indicating that the conversation is associated with a statistics module 120.

If, at the block 156, the conversation identified at the block 154 is associated with a statistics module 120, the routing module 118 may, at the block 158, select that associated statistics module.

If, at the block 156, the conversation identified at the block 154 is not associated with a statistics module 120, the routing module 118 may, at the block 160, select a statistics module 120 according to one or more predetermined factors. Such factors may include, but are not limited to, how busy the individual statistics modules 120 are currently, how busy the individual statistics modules 120 have been in the past, how busy the individual statistics modules 120 have been during a particular time period, how many conversations are associated with the individual statistics modules 120, and/or other suitable factors. Desirably, the routing module 118 may use the predetermined factors to help load balance the received messages among the statistics modules 120. Thus, the predetermined factors may include load balancing factors.

At the block 160, the routing module 118 may also associate the selected statistics module 120 with the conversation identified at the block 154. For example, the routing module 118 may add, to the data structure 124, data indicating that the conversation is associated with the statistics module 120.

Exemplary Networking Systems

It will be appreciated that the diagnostic module 102 may be used to implement a variety of networking systems, networking diagnostic systems, and the like. FIGS. 7, 8A, 8B and 9 illustrate various embodiments of the networking system 100 shown in FIG. 1.

Figure 7:
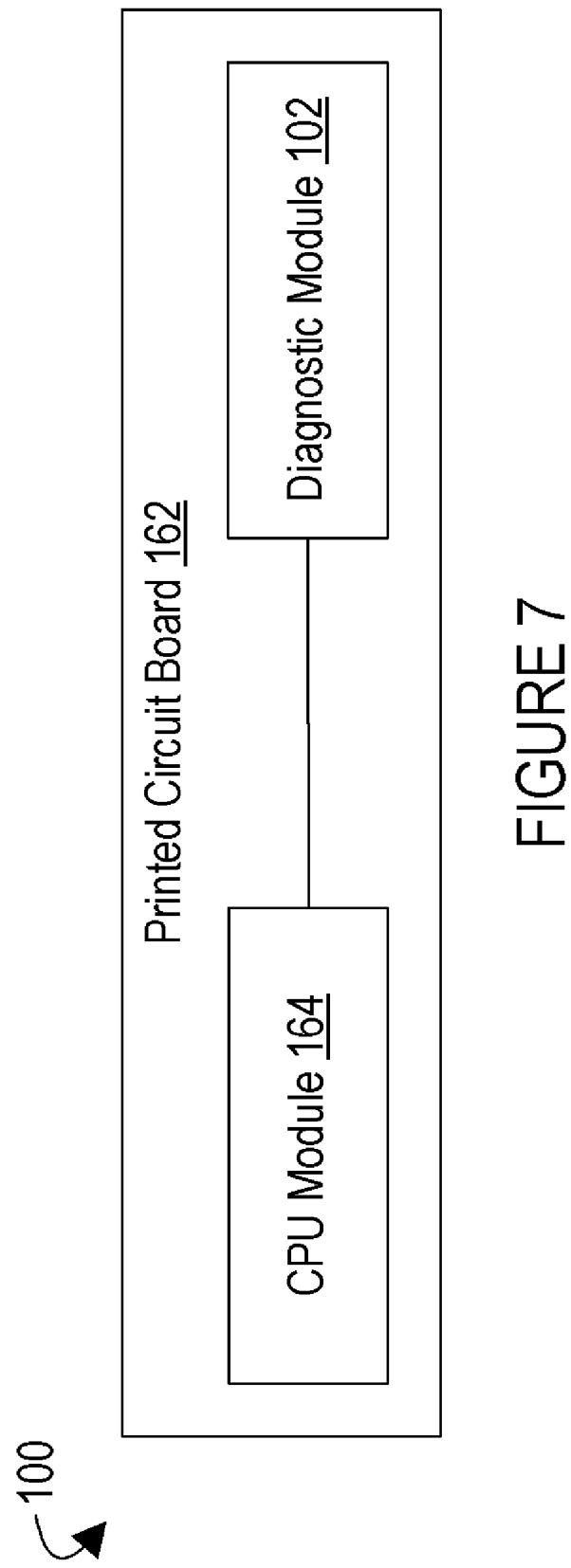
FIG. 7 is a block diagram illustrating an embodiment of the networking system shown in FIG. 1.

As shown in FIG. 7, the networking system 100 may include a printed circuit board 162, which may include a CPU module 164 and the diagnostic module 102. The diagnostic module 102 may be coupled to the CPU module 164 using any suitable interface. The printed circuit board 162 may include one or more CPU modules and may include one or more diagnostic modules, depending upon the particular configuration.

As shown in FIG. 8A, the networking system 100 may include a blade 166, which may comprise a printed circuit board. The blade 166 may include an interface 168 and the diagnostic module 102. The diagnostic module 102 may be coupled to the interface 168.

As shown in FIG. 8B, a chassis computing system 170 may include one or more CPU modules (such as, a CPU module 172), which may be adapted to interface with one, two, or more blades or other printed circuit boards. For example, a blade may have an interface (such as, the interface 168) though which the diagnostic module 102 may send network diagnostic statistics to the CPU module. The chassis computer system adapted to receive one or more printed circuit boards or blades.

A CPU module, such as, the CPU modules 164 and 172, may transmit the network diagnostic statistics it receives to a local storage device, a remote storage device, or any other suitable system for retrieval and/or further analysis of the statistics. A client software program may retrieve, access, and/or manipulate the statistics for any suitable purpose. Examples of systems and methods for storing and retrieving network diagnostic statistics include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, which is hereby incorporated by reference herein in its entirety.

As shown in FIG. 9, an appliance (such as, an appliance 174) may comprise one or more diagnostic modules (such as, the diagnostic module 102). Depending on the particular configuration, the appliance 174 may include any suitable combination of one or more CPU modules (such as, a CPU module 176) and one or more diagnostic modules. In one embodiment, an appliance may include and/or be in communication with one or more storage devices (such as, a storage device 178), which may advantageously be used for storing any suitable diagnostic data, statistics, and the like. In one embodiment, an appliance may include and/or be in communication with one or more client interface modules (such as, a client interface module 180), which may advantageously be used for displaying information to a user, receiving user input from a client software program, sending information to a client software program, or both. The appliance may also include and/or be in communication with one or more display devices adapted to display information, one or more user input devices (such as, a keyboard, a mouse, a touch screen, and the like) adapted to receive user input, or both.

Exemplary Multi-Tier Networking System

Figure 10:
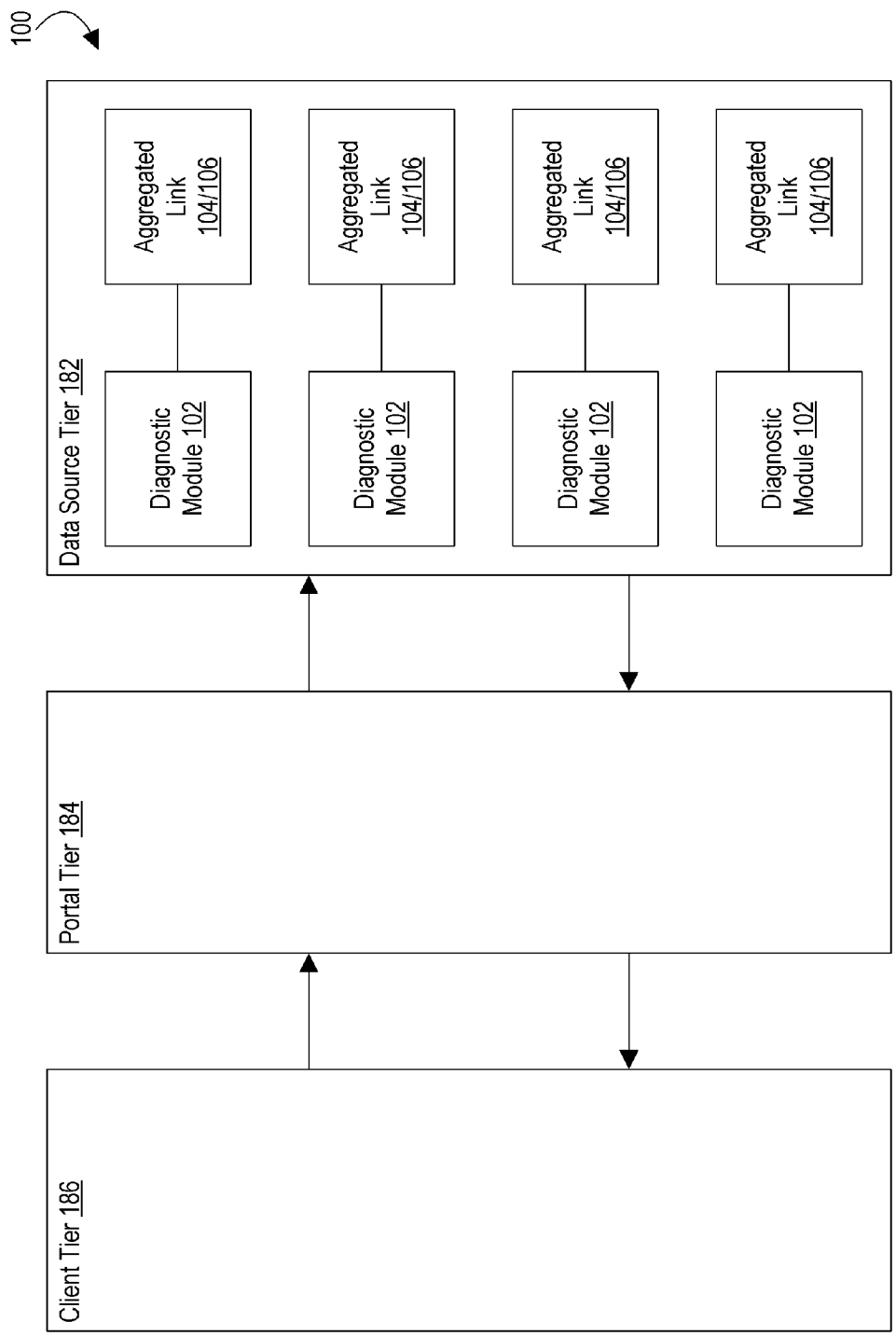
FIG. 10 is a block diagram of an embodiment of the networking system shown in FIG. 1, according to an embodiment of the invention.

As shown in FIG. 10, the networking system 100 may include a plurality of distinct tiers of functional components, including a data source tier 182, a portal tier 184, and a client tier 186.

The data source tier 182 preferably comprises a plurality of diagnostic modules 102, which may generate statistics, for example, as discussed above.

The portal tier 184 may collect, manage and/or reformat the statistics generated by the diagnostic modules 102 of the data source tier 182. In addition, the portal tier 184 may aggregate the statistics from two or more diagnostic modules 102, if desired. The portal tier 184 is preferably implemented in a software or firmware based module executing within a programmable device, such as a host computer.

The client tier 186 preferably comprises software implemented clients that may provide visualizations of the statistics generated by the diagnostic modules 102. In addition, the client tier 186 may be used to configure the function of the portal tier 184.

Examples of systems and methods for a plurality of distinct tiers of functional components include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, which is hereby incorporated by reference herein in its entirety. It will be appreciated that the networking system 100 does not require a plurality of distinct tiers of functional components and that the networking system 100 does not require a data source tier, a portal tier, or a client tier.

Exemplary Ethernet LAN Statistics

As described above, a statistics module 120 may generate a variety of statistics. In some embodiments, statistics may be generated for Ethernet LANs or other networks.

In one embodiment, the Ethernet LAN statistics may include protocol distribution statistics, which may include any combination of the following: the number of packets for a protocol, the percent of all packets which were this protocol, the number of octects (bytes) for this protocol, the percent of all bytes which were this protocol, the percent of the theoretical bandwidth used by this protocol, and/or other like statistics.

In one embodiment, the Ethernet LAN statistics may include a variety of host-specific stats, which may include any combination of the following: the number of frames destined for the host, the number of frames from the host, the number of frames to and from the host, the number of bytes destined for the host, the number of bytes from the host, the number of bytes to and from the host, the number of errors from the host, the number of broadcast frames from the host, the number of multicast frames from the host, the percent of all frames that are destined for the host, the percent of all frames that are from the host, the percent of all frames that are to or from the host, the percent of all bytes that are destined for the host, the percent of all bytes that are from the host, the percent of all bytes that are to or from the host, the percent of the theoretical bandwidth used by traffic destined for the host, the percent of the theoretical bandwidth used by traffic from the host, the percent of the theoretical bandwidth used by traffic to and from the host, the average size in bytes for frames that are destined for the host, the average size in bytes for frames that are from the host, the average size in bytes for all frames to or from the host, and/or other like statistics.

In one embodiment, the Ethernet LAN statistics may include a variety of host-specific, network-layer statistics, such as, for a particular virtual LAN. The host-specific, network-layer statistics may include any combination of: the number of frames in the number of frames out, the number of frames in and out, the number of bytes in, the number of bytes out, the number of bytes in and out, the number of non-unicast frames, the percent of all frames that are destined for the host, the percent of all frames that are from the host, the percent of all frames that are to or from the host, the percent of all bytes that are destined for the host, the percent of all bytes that are from the host, the percent of all bytes that are to or from the host, the percent of the theoretical bandwidth used by traffic destined for the host, the percent of the theoretical bandwidth used by traffic from the host, the percent of the theoretical bandwidth used by traffic to and from the host, the average size in bytes for frames that are destined for the host, the average size in bytes for frames that are from the host, the average size in bytes for all frames to or from the host, and/or other like statistics.

In one embodiment, the Ethernet LAN statistics may include a variety of host-specific, application-layer statistics, such as, for a particular virtual LAN identifier and application protocol. The host-specific, application-layer statistics may include any combination of: the number of frames in the number of frames out, the number of frames in and out, the number of bytes in, the number of bytes out, the number of bytes in and out, the percent of all frames that are destined for the host, the percent of all frames that are from the host, the percent of all frames that are to or from the host, the percent of all bytes that are destined for the host, the percent of all bytes that are from the host, the percent of all bytes that are to or from the host, the percent of the theoretical bandwidth used by traffic destined for the host, the percent of the theoretical bandwidth used by traffic from the host, the percent of the theoretical bandwidth used by traffic to and from the host, the average size in bytes for frames that are destined for the host, the average size in bytes for frames that are from the host, the average size in bytes for all frames to or from the host, and/or other like statistics.

In one embodiment, the Ethernet LAN statistics may include a variety of multi-host statistics, such as, for a pair of hosts. The multi-host statistics may include any combination of the following: the number of frames from a first host to a second host, the number of frames from the second host to the first host, the number of frames between the first host and the second host, the number of bytes from the first host to the second host, the number of bytes from the second host to the first host, the number of bytes between the first host and the second host, the percent of all frames that are from the first host to the second host, the percent of all frames that are from the second host to the first host, the percent of all frames that are the conversation between the first host and the second host, the percent of all bytes that are from the first host to the second host, the percent of all bytes that are from the second host to the first host, the percent of all bytes that are the conversation between the first host and the second host, the percent of the theoretical bandwidth used by data from the first host to the second host, the percent of the theoretical bandwidth used by data from the second host to the first host, the percent of the theoretical bandwidth used by the conversation between the first host and the second host, the average size in bytes for frames from the first host to the second host, the average size in bytes for frames from the second host to the first host, the average size in bytes for all frames between the first host and the second host, the number of errors from the first host to the second host, the number of errors from the second host to the first host, the number of errors between the first host and the second host, and/or other like statistics.

In one embodiment, the Ethernet LAN statistics may include a variety of multi-host, network-layer statistics, such as, for a particular virtual LAN. The multi-host, network-layer statistics may include any combination of the following:

the number of frames from a first host to a second host, the number of frames from the second host to the first host, the number of frames between the first host and the second host, the number of bytes from the first host to the second host, the number of bytes from the second host to the first host, the number of bytes between the first host and the second host, the percent of all frames that are from the first host to the second host, the percent of all frames that are from the second host to the first host, the percent of all frames that are the conversation between the first host and the second host, the percent of all bytes that are from the first host to the second host, the percent of all bytes that are from the second host to the first host, the percent of all bytes that are the conversation between the first host and the second host, the percent of the theoretical bandwidth used by data from the first host to the second host, the percent of the theoretical bandwidth used by data from the second host to the first host, the percent of the theoretical bandwidth used by the conversation between the first host and the second host, the average size in bytes for frames from the first host to the second host, the average size in bytes for frames from the second host to the first host, the average size in bytes for all frames between the first host and the second host, and/or other like statistics.

In one embodiment, the Ethernet LAN statistics may include a variety of multi-host, application-layer statistics, such as, for a particular virtual LAN identifier and application protocol. The multi-host, application-layer statistics may include any combination of the following: the number of frames from a first host to a second host, the number of frames from the second host to the first host, the number of frames between the first host and the second host, the number of bytes from the first host to the second host, the number of bytes from the second host to the first host, the number of bytes between the first host and the second host, the percent of all frames that are from the first host to the second host, the percent of all frames that are from the second host to the first host, the percent of all frames that are the conversation between the first host and the second host, the percent of all bytes that are from the first host to the second host, the percent of all bytes that are from the second host to the first host, the percent of all bytes that are the conversation between the first host and the second host, the percent of the theoretical bandwidth used by data from the first host to the second host, the percent of the theoretical bandwidth used by data from the second host to the first host, the percent of the theoretical bandwidth used by the conversation between the first host and the second host, the average size in bytes for frames from the first host to the second host, the average size in bytes for frames from the second host to the first host, the average size in bytes for all frames between the first host and the second host, and/or other like statistics.

In one embodiment, the Ethernet LAN statistics may include a variety of utilization-related statistics, which may include any combination of the following: the number of frames captured, the number of frames received, the number of broadcast frames, the number of multicast frames, the number of unicast frames, the number of bytes received, the percentage of the max theoretical throughput used, and/or other like statistics.

In one embodiment, the Ethernet LAN statistics may include a variety of error-related statistics, which may include any combination of the following: the number of frame errors, the number of CRC alignment errors, the number of undersized frames, the number of oversized frames, the number of frame fragments, the number of jabber frames, the number of collisions, the number of packets dropped, and/or other like statistics.

In one embodiment, the Ethernet LAN statistics may include a variety of frame-size statistics, which may include any combination of the following: the total number of frames, the total number of bytes, the number of undersize frames, the percent of all frames that are undersized, the number of frames 64 bytes long, the percent of all frames that are 64 bytes long, the number of frames 65-127 bytes long, the percent of all frames that are 65-127 bytes long, the number of frames 128-255 bytes long, the percent of all frames which are 128-255 bytes long, the number of frames 256-511 bytes long, the percent of all frames that are 256-511 bytes long, the number of frames 512-1103 bytes long, the percent of all frames that are 512-1103 bytes long, the number of frames 1104-1518 bytes long, the percent of all frames that are 1104-1518 bytes long, the number of oversize frames, the percent of all frames that are oversized, the average size in bytes for all frames, and/or other like statistics.

In one embodiment, the statistics may include a variety of other host-specific, application-layer statistics, such as, for a particular application protocol. These host-specific, application-layer statistics may include a minimum response time for a host, a maximum response time for a host, an average response time for a host, a total response time for a host, a number of connections to the host for a particular application protocol, and/or other like statistics.

Of course, any of the Ethernet LAN statistics may be used for any suitable type of network other than a LAN using any suitable protocol other than Ethernet.

Exemplary SAN Statistics

As described above, a statistics module 120 may generate a variety of statistics. In some embodiments, statistics may be generated for Ethernet LANs or other networks. In some embodiments, statistics may be generated for SANs.

In one embodiment, the SAN statistics may include a variety of Fibre Channel link metrics, which may include any combination of the following: the total number of frames of any type per second, the total megabytes of frame payload data per second (which may exclude the SOF, Header, CRC, and EOF portions of the frame), the total number of SCSI frames per second (which may include SCSI Command, Transfer Ready, Data and Status frames), the total megabytes of SCSI frame payload data per second (which may include SCSI Command, Transfer Ready, Data and Status frames, but may exclude the SOF, Header, CRC or EOF), the total number of Fibre Channel management frames per second (which may include Extended Link Services or ELS, Basic Link Services or BLS, Fibre Channel Services or FCS, Link Control or LC, and Fabric Frames or SOF(f)), the total megabytes of FC Management frame payload data per second (which may include ELS, BLS, FCS, LC, and SOF(f), but may exclude the SOF, Header, CRC or EOF), the total number of Non-Management and Non-SCSI frames per second, the total megabytes of Non-Management and Non-SCSI frame payload data per second (which may not include the SOF, Header, CRC or EOF), total application data frames per second (which may include solicited and unsolicited data frames), total megabytes of application payload data per second (which may include the payload of solicited and unsolicited data frames), the percentage of total theoretical bus capacity consumed by the payload bytes, the percentage of total theoretical bus capacity consumed by Fibre Channel management frames, the percentage of total theoretical bus capacity consumed by the SCSI frame payload bytes, the percentage of total theoretical bus capacity consumed by the Non-SCSI and Non-Management frame payload bytes, and/or other like statistics.

In one embodiment, the SAN statistics may include a variety of Fibre Channel link event statistics, which may include any combination of the following: the number of times a link has transitioned into a Loss of Sync state in an interval, the number of times a link has transitioned to a Loss of Signal state in an interval, the number of primitive sequences of LIP events (e.g., when a LIP event reinitializes the FC loop and thus cancels all outstanding I/O's), the number of primitive sequences of NOS and OLS events (e.g., when a NOS/OLS event reinitializes the FC link and thus cancels all outstanding I/O's), the number of Fibre Channel Extended Link Services Frames (such as, LOGO, PLOGI, ACC, and the like) in an interval, the number of Fibre Channel Services Frames (such as, Directory Server Management and FC-AL Management) in an interval, the number of Fabric Frames (such as, frames that begin with the SOF(f) primitive) in an interval, the number of Basic Link Services Frames (such as, ABTS, BA_ACC, BA_RJT, and the like) in an interval, the number of Link Control Frames (which may include P_RJT, F_RJT, F_BSY, and may exclude ACK) in an interval, the number of times a link has returned to an Idle state after any LOS, LOSIG, LIP or NOS/OLS events, the number of SCSI Check Condition Status Frames in an interval, the number of SCSI Bad Status Frames (which may include QueueFull, Busy, Condition Met, and the like; but may exclude SCSI Check Condition Status Frames) in an interval, the number of SCSI Task Management Frames (such as, Target Reset, LUN Reset, Clear ACA, and the like) in an interval, the number of FC Code Violations (such as, a bit error or a disparity error that occurred in a Fibre Channel word) in an interval, framing errors that may occur on any link with media or transmission problems (such as, bad or missing CRC; bad or missing SOF/EOF values; improperly truncated frames, such as, jabber or runt frames; EOFa, EOFni, and EOFdti frames; and the like), and/or other like statistics.

In one embodiment, the SAN statistics may include a variety of Fibre Channel link group statistics, which may include any combination of the following: the number of Login type frames (such as, FLOGI, PLOGI, PRLI, ADISC, PDISC, and FDISC frames) in an interval, the number of Logout type frames (such as, LOGO, PRLO, and TPRLO frames) in an interval, the number of ABTS frames in an interval, the number of Notification type frames (such as, FAN and RSCN frames) in an interval, the number of Reject type frames (such as, LS_RJT, BA_RJT, P_RJT, and F_RJT frames) in an interval, the number of Busy type frames (such as, P_BSY and F_BSY frames) in an interval, the number of Accept type frames (such as, BA_ACC and ACC frames) in an interval, the number of Loop Initialization frames (such as, LISM, LIFA, LIPA, LIHA, LISA, LIRP, and LILP frames) in an interval, and/or other like statistics.

In one embodiment, the SAN statistics may include a variety of SCSI link pending exchange statistics, which may include any combination of the following: the number of exchanges that have been opened, but not closed in an interval; the maximum number of exchanges open at one time during an interval, and/or other like statistics. In one embodiment, the SAN statistics may include a variety of initiator-target/LUN statistics, such as, for conversations between a given initiator and a given SCSI target and/or Logical Unit Number (collectively ITL). The initiator-target/LUN statistics may include any combination of the following: the amount of overall bus capacity utilized by SCSI exchanges between the specified ITL, the number of frames per second used by SCSI exchanges between the specified ITL, the frames/sec metric for the specified ITL expressed as a percentage of all frames sent this second, the number of megabytes of frame payload sent per second between the specified ITL (which may exclude the SOF, Header, CRC or EOF), the MB/sec metric for the specified ITL expressed as a percentage of all MB sent this second, the number of SCSI Task Management Frames (such as, Target Reset, LUN Reset, Clear ACA, and the like) for the specified ITL in an interval, the number of SCSI Bad Status Frames (which may include QueueFull, Busy, Condition Met, but may exclude SCSI Check Condition Status Frames) for the specified ITL in an interval, the number of SCSI Check Condition Status Frames for this ITL in an interval, the number of SCSI exchanges aborted during this interval, and/or other like statistics.

In one embodiment, the SAN statistics may include a variety of initiator-target/LUN statistics for a storage device, which may include any combination of the following: the total amount of elapsed time from the SCSI Read Command to the First Data for all exchanges for a specified ITL that completed in an interval, the average amount of elapsed time from the SCSI Read Command to the First Data for all exchanges for a specified ITL that completed in an interval, the minimum amount of elapsed time from the SCSI Read Command to the First Data for all exchanges for a specified ITL that completed in an interval, the maximum amount of elapsed time from the SCSI Read Command to the First Data for all exchanges for a specified ITL that completed in an interval, and/or other like statistics.

In one embodiment, the SAN statistics may include a variety of initiator-target/LUN statistics for various types of exchanges, such as, a read exchange, a write exchange, or other exchange. The ITL exchange statistics may include any combination of the following: the total number of frames per second used by the exchanges between the specified ITL, the total number of megabytes per second used by the exchanges between the specified ITL (which may include the SOF, Header, CRC or EOF), the number of commands issued for the specified ITL in an interval, the number of commands completed for the specified ITL in an interval, the total amount of elapsed time for the SCSI exchanges for the specified ITL that completed in an interval, the average amount of elapsed time per SCSI exchange for the specified ITL that completed in an interval, the minimum amount of elapsed time per SCSI exchange for the specified ITL that completed in this interval, the maximum amount of elapsed time per SCSI exchange for the specified ITL that completed in an interval, the minimum number of data bytes requested for any SCSI exchange for the specified ITL that completed in an interval, the maximum number of data bytes requested for any SCSI exchange for the specified ITL that completed in an interval, and/or other like statistics.

In one embodiment, the SAN statistics may include a variety of SCSI link pending exchange statistics for a specified, which may include any combination of the following: the number of exchanges that have been opened, but not closed in an interval; the maximum number of exchanges open at one time during an interval, and/or other like statistics.

In one embodiment, the SAN statistics may include a variety of SCSI status metrics that indicate one or more of the following: a SCSI status value associated with a frame, one or more sense codes associated with a frame, a timestamp indicating when the frame was observed, an ITL value, and any other suitable information.

In one embodiment, the SAN statistics may include any of a variety of vSAN statistics for at least one vSAN.

Of course, any of the SAN statistics may be used for any suitable type of network other than a SAN or vSAN using any suitable protocol other than Fibre Channel.

Exemplary Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The methods and systems described above require no particular component or function. Thus, any described component or function—despite its advantages—is optional. Also, some or all of the described components and functions described above may be used in connection with any number of other suitable components and functions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network diagnostic system comprising:
one or more processors and one or more physical storage media, the one or more physical storage media having stored thereon a network diagnostic module configured to be executed by the one or more processors and to cause the network diagnostic system to receive a plurality of network messages from a plurality of communication paths of an aggregated link and cause the network diagnostic system to perform at least one network diagnostic function using the plurality of network messages, the network diagnostic module comprising:
a first message receiving module configured to process network messages from a first communication path among the plurality of communications paths of the aggregated link into a first plurality of messages having an alternate structure that is different from the structure of the network messages received from the first communication path;
a second message receiving module configured to process network messages from a second communication path among the plurality of communication paths of the aggregated link into a second plurality of messages having an alternate structure that is different from the structure of the network messages received from the second communication path;
a plurality of individual statistics modules each configured to generate network diagnostic statistics; and
a routing module configured to selectively route at least a portion of the first plurality of messages to any of the plurality of statistics modules, and further being configured to route at least a portion of the second plurality of messages to any of the plurality of statistics modules,
wherein the statistics modules generate the network diagnostic statistics in response to the first and second plurality of messages.

2. The network diagnostic system of claim 1, wherein the routing module, to route a message to any of the plurality of statistics modules, is configured to select one of the plurality of statistics modules and to send the message to the selected statistics module.

3. The network diagnostic system of claim 2, wherein the routing module, to select one of the plurality of statistics modules, is configured to identify a conversation associated with the message; to, if the conversation is associated with a first statistics module, select the first statistics module; and to, if the conversation is not associated with any statistics module of the plurality of statistics modules, select a second statistics module according to at least one predetermined factor.

4. The network diagnostic system of claim 2, wherein the routing module, to select one of the plurality of statistics modules, is configured to identify a conversation associated with the message; to, if the conversation is associated with a first statistics module, select the first statistics module; and to, if the conversation is not associated with any statistics module of the plurality of statistics modules, select a second statistics module according to at least one load balancing factor.

5. The network diagnostic system of claim 1, further comprising:
- a first buffer embodied on a storage device, the first message receiving module being configured to store the first plurality of messages in the first buffer, the routing module being configured to receive the first plurality of messages from the first buffer; and
- a second buffer embodied on a storage device, the second message receiving module being configured to store the second plurality of messages in the second buffer, the routing module being configured to receive the second plurality of messages from the second buffer.

6. The network diagnostic system of claim 1, further comprising an appliance that includes the network diagnostic module and a storage device.

7. The network diagnostic system of claim 1, wherein the aggregated link is a trunk line.

8. A network diagnostic system comprising:
- one or more processors and one or more physical storage media, the one or more physical storage media having stored thereon a network diagnostic module configured to be executed by the one or more processors and to cause the network diagnostic system to receive a plurality of network messages from a plurality of communication paths of an aggregated link and cause the network diagnostic system to perform at least one network diagnostic function using the plurality of network messages, the network diagnostic module comprising:
  - a plurality of individual statistics modules each configured to generate network diagnostic statistics;
  - a routing module configured to route a first plurality of messages to any of a first set of two or more of the plurality of individual statistics modules, the first plurality of messages being derived from network messages from a first communication path of an aggregated link, the first plurality of messages being processed to have a structure that is different from the structure of the network messages of the first communication path; the routing module being further configured to route a second plurality of messages to any of a second set of two or more of the plurality of individual statistics modules, the second plurality of messages being derived from network messages from a second communication path of the aggregated link, the second plurality of messages being processed to have a structure that is different from the structure of the network messages of the second communication path; and at least one member of the first set being in the second set.

9. The network diagnostic system of claim 8, wherein the routing module, to route a message to any of a set of statistics modules, is configured to select one of the set of statistics modules and to send the message to the selected statistics module.

10. The network diagnostic system of claim 9, wherein the routing module, to select one of the set of statistics modules, is configured to identify a conversation associated with the message; to, if the conversation is associated with a first statistics module, select the first statistics module; and to, if the conversation is not associated with any statistics module of the plurality of statistics modules, select a second statistics module according to at least one predetermined factor.

11. The network diagnostic system of claim 9, wherein the routing module, to select one of the set of statistics modules, is configured to identify a conversation associated with the message; to, if the conversation is associated with a first statistics module, select the first statistics module; and to, if the conversation is not associated with any statistics module of the plurality of statistics modules, select a second statistics module according to at least one load balancing factor.

12. The network diagnostic system of claim 8, further comprising an appliance that includes the network diagnostic module and a storage device.

13. The network diagnostic system of claim 8, wherein the aggregated link is a trunk line.

14. The network diagnostic system of claim 1, wherein each of the statistics modules is executed by a different processor.

15. The network diagnostic system of claim 1, wherein the first message receiving module is configured to process network messages from the first communication path among the plurality of communication paths of the aggregated link into the first plurality of messages having the alternate structure by including inter-packet meta-data in at least some of the first plurality of messages having the alternate structure.

16. The network diagnostic system of claim 1, wherein the first message receiving module is configured to process network messages from the first communication path among the plurality of communication paths of the aggregated link into the first plurality of messages having the alternate structure by including timestamps in at least some of the first plurality of messages having the alternate structure.

17. The network diagnostic system of claim 1, wherein the first message receiving module is configured to process network messages from the first communication path among the plurality of communication paths of the aggregated link into the first plurality of messages having the alternate structure by adding at least two delimiters that indicate a start and an end of each of the first plurality of messages having the alternate structure.

18. The network diagnostic system of claim 1, wherein the first message receiving module is configured to process network messages only from the first communication path, and the second message receiving module is configured to process network messages only from the second communication path.

19. The network diagnostic system of claim 1, wherein the network diagnostic statistics include a number of frames from a first host to a second host, a number of frames from the second host to the first host, a number of frames between the first host and the second host, a number of bytes from the first host to the second host, a number of bytes from the second host to the first host, a number of bytes between the first host and the second host, a percent of all frames that are from the first host to the second host, a percent of all frames that are from the second host to the first host, a percent of all frames that belong to a conversation between the first host and the second host, a percent of all bytes that are from the first host to the second host, a percent of all bytes that are from the second host to the first host, a percent of all bytes that belong to the conversation between the first host and the second host, a percent of a theoretical bandwidth used by data from the first host to the second host, a percent of the theoretical bandwidth used by data from the second host to the first host, the percent of the theoretical bandwidth used by the conversation between the first host and the second host, an average size in bytes for frames from the first host to the second host, an average size in bytes for frames from the second host to the first host, an average size in bytes for all frames between the first host and the second host, a number of errors from the first host to the second host, a number of errors from the second host to the first host, and a number of errors between the first host and the second host.

20. The network diagnostic system of claim 8, wherein at least one member of the first set of statistics modules is not included in the second set of statistics modules.

* * * * *